United States Patent [19]
Bennett

[11] Patent Number: 5,402,692
[45] Date of Patent: Apr. 4, 1995

[54] METHOD OF MAKING BLANKING DIES AND PUNCHES HAVING ROUNDED EDGES

[76] Inventor: Edward D. Bennett, 1401 S. Ocean Blvd., Pompano, Fla. 33062

[21] Appl. No.: 105,288

[22] Filed: Aug. 10, 1993

[51] Int. Cl.⁶ .................. B23P 15/24; B23H 1/06; B23H 1/00
[52] U.S. Cl. .................. 76/107.1; 219/69.17
[58] Field of Search .................. 76/107.1, 107.4; 219/69.11, 69.15, 69.17

[56] References Cited

U.S. PATENT DOCUMENTS

| | | | |
|---|---|---|---|
| 3,564,190 | 8/1971 | Kandajan et al. | 219/69.17 X |
| 4,400,606 | 8/1983 | Itoh et al. | 219/69.17 |
| 4,431,897 | 2/1984 | Itoh | 219/69.17 X |
| 4,736,056 | 4/1988 | Futamura | 76/107.1 |

FOREIGN PATENT DOCUMENTS

| | | | |
|---|---|---|---|
| 2550649 | 5/1976 | Germany | 219/69.17 |

OTHER PUBLICATIONS 4 pages of Brochure on Roboform 40 by Charmilles Technologies of Geneva, Switzerland.
2 pages from Micro Tool, Inc. on Micro's Corner Rounding Cutters.

*Primary Examiner*—Douglas D. Watts
*Attorney, Agent, or Firm*—Davis, Bujold & Streck

[57] ABSTRACT

A method of electrical discharge machining a curvature onto the cutting edge of a punch or die. An electrode has a cross-section that is identical in shape as the cross-section of the punch or an opening of the die to be machined. The electrode is centered relative to the punch or die; an electrical charge is applied to the electrode; the electrode is moved in a small orbital path, without changing the orientation of the electrode; and the electrode is translated along its axis while simultaneously varying the diameter of the orbital path of the electrode in time relation with the translation of the electrode along its axis, thereby electrical discharge machining the curvature onto the cutting edge of the punch or die.

10 Claims, 3 Drawing Sheets ns the edge of the die respectively according to the method of the invention.

METHOD OF MAKING BLANKING DIES AND PUNCHES HAVING ROUNDED EDGES

FIELD OF THE INVENTION

This invention relates to the production of components in the form of blanking punches and dies for stamping smooth edged blanks from a sheet of stock material, in particular, punches and dies having rounded cutting edges.

Background of the Invention

Conventional stamping methods suffer from the disadvantage known as die break. A conventional punch and die produces an initial shearing action in the material after which the blank is severed by fracturing. The fractured portion is the "die break" and is rough and granular in nature. As the thickness of the blank from which the stamping is produced increases so does the problem of die break.

The problem of die break is largely averted by the extrusion process known as "fine blanking". The process of fine blanking also suffers from substantial drawbacks. Fine blanking requires that the stock material from which the blank is stamped be very tightly and securely clamped by a special device called a "stinger" so that the stock material is prevented from flowing away from the punch. A stinger is a pointed ridge or V-shaped member that encircles the area to be stamped out and serves to engage and in fact "bite into" the stock material. The fact that the stinger needs to be precisely located, and needs to securely clamp the surplus blank material requires a stamping die and press which is intricate, expensive and cumbersome.

A shearing process called "grip flow" also averts, at a lower cost than "fine blanking", the problem of die break. This "grip flow" process as disclosed in the inventor's prior U.S. Pat. No. 4,267,753, does not involve tightly clamping the stock material around the area to be blanked and thereby does away with the need to provide a stinger. According to the grip flow process the area of the stock material that will be blanked is only clamped tightly enough to keep the stock material from buckling during the blanking operation. The elimination of the stinger allows for more stampings to be produced per unit length of stock material, and allows the stock material to freely flow away from the blanking punch which has the beneficial effect of reducing heat and friction around the blanking punch during stock removal, thereby increasing the life of the blanking punch.

According to the grip flow process a closely mating punch and die are provided, with one of either the punch or the die having a rounded cutting edge (e.g. radius, parabolic, etc.).

The edge of the punch or die facing the edge of the blank that is desired to be smooth is the rounded edge. The curvature (e.g. radius) of the edge is critical to the grip flow process. The magnitude of curvature of the rounded edge necessary to produce a smooth edge on the blank varies with the material type, hardness and thickness of the blank to be punched out. In the prior art grip flow process, the curvature of the rounded edge is determined by manually producing a curve on the edge of a punch or die using either hand grinding tools, files or polishing cloth. A test blank is then punched out and the edge of the test blank is examined. If the blank does not have a properly smooth edge, the magnitude of curvature of the rounded edge on the punch or die is changed by manually increasing or decreasing the curvature and another test blank is punched out. This process is repeated until a satisfactory smooth edge is produced on the blank.

Manually producing the rounded edge onto the punch or die is very expensive, labor intensive and inaccurate. It takes a skilled machinist to produce a curve on the edge of a punch or die. Even the most highly skilled machinists are unable to accurately machine an edge having a consistent curvature, particularly, when the punch or die has a complex shape.

The biggest problem in producing quality parts for an extended period of time with the grip flow process is the inconsistency of the curved edge. If the curvature is too large on any portion of the rounded edge, the stamping produced will have excessive die roll. If the curvature is too small on any portion of the edge, die break or tears results on the stamping produced. If the curvature differs from one side of the die or punch to the other, the die or punch can be pushed out of alignment when the punch enters the die during stamping thus producing a poor quality stamping.

It is an object of this invention to provide a method for accurately, quickly and inexpensively producing rounded edges on punches and dies using the electrical discharge machining process (EDM) which is a process of metal removal and shaping by means of electrical discharges between an electrode (cutting tool) and an electro-conductive work piece (punch or die) in the presence of a liquid dielectric medium (coolant) coupled with an orbital motion.

SUMMARY OF THE INVENTION

According to the invention there is provided a method of forming a curve on a cutting edge defining a desired shape of a desired size on a metallic component in the form of a punch or die, comprising the steps of providing an electrode having a shape corresponding to the desired shape and sized to facilitate electrical discharge machining of the curve on the edge; positioning the electrode in relation to the edge with a clearance therebetween; generating a potential difference, between the component and the electrode, capable of electrically discharge machining the edge; moving the electrode in an orbital path in a plane without changing the orientation of the electrode relative to the component to discharge machine the edge; translating the electrode normal to the plane; varying the magnitude of the orbital path in relation to the translation to form the curve onto the edge.

BRIEF DESCRIPTION OF THE DRAWINGS

The invention will now be described, by way of example, with reference to the accompanying drawings, in which.

DETAILED DESCRIPTION OF THE INVENTION

Figure 1:
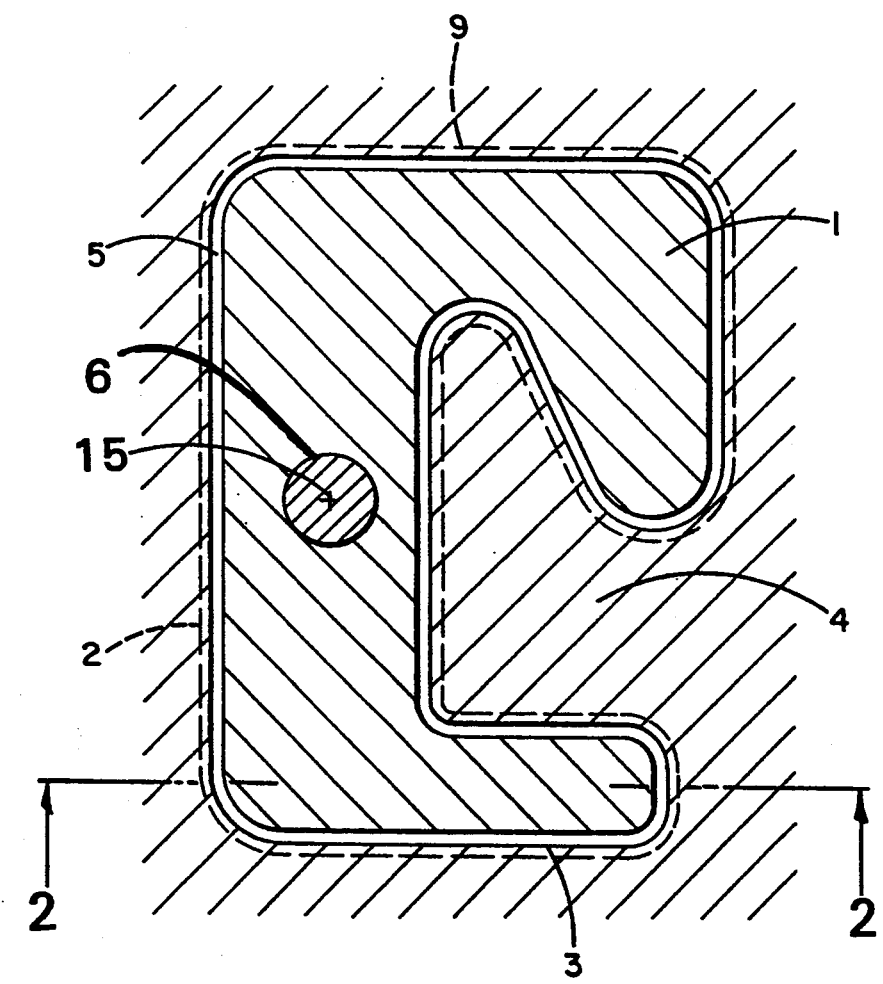
FIG. 1 is a cross-sectional top view of an electrode, for use in a method according to the invention, centered in a die to machine a curve onto the edge of the die.

FIG. 1 is a cross-section, taken in a plane parallel to the plane of the cutting face 10 (see FIG. 2) of a component in the form of a die 4, of an electric discharge machine (EDM) electrode 1, for machining a curve 2 (dashed line in FIG. 2) onto the edge 3 of the die 4. The electrode 1 is shown in a neutral centered position in the die 4.

The die 4, as shown in FIG. 1 has an opening therein that corresponds to the size and shape of the desired opening. The shape of the electrode 1 as seen in FIG. 1 (i.e. in a plane parallel to the plane of the cutting face 10 of the die 4 and normal to the direction Z in which a punch will move relative to the die 4 to stamp a part to be produced by the punch and die) corresponds to the shape of the desired opening of the die 4 (in the same plane) though slightly smaller in size so that the electrode fits into the die in a closely spaced fashion to allow the electrical discharge machining of the curve onto the edge. The curve 2 may be formed with any desired shape (e.g. a portion of a circle, parabola, ellipse, etc.). The opening has a length (e.g. direction Z) normal to the cutting face, and a cross-section (the shape), normal to its length, which is constant.

It can be appreciated that in order to electrically discharge machine a curve 2 onto the edge of a component in the form of a punch, rather than onto the edge of a die, the electrode 1 and the die 4 would be reversed, the electrode 1 becoming the punch to be machined and the die 4 becoming the electrode. The electrode would then be sized to closely fit over the punch just as the electrode 1 in FIG. 1 is sized to closely fit into the die 4.

Figure 7:
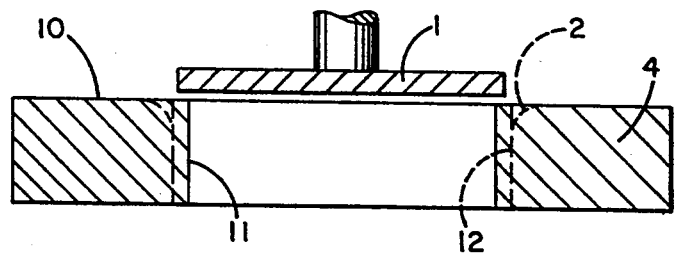
FIGS. 7 and 8 show an electrode positioned above (FIG. 7) and after translation (FIG. 8) into and machining a die having an unfinished opening that is smaller in size than desired.
Figure 8:
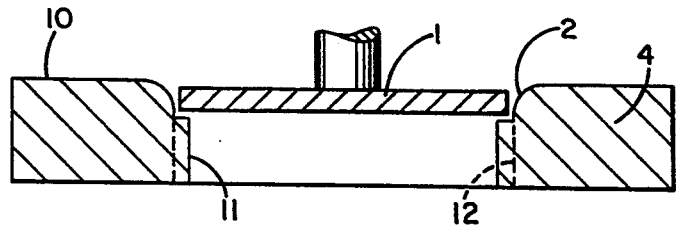

It can also be appreciated that the opening in the die 4 may not be finished to the exact size and shape of the desired opening, and may even be smaller than the desired size (e.g. opening 11 in FIGS. 7 & 8). In this case, the electrode 1 may be used to finish the opening in the die to the desired size 12 and shape following machining the curve 2 on the edge (FIG. 8). Alternatively, an electrode in the form of a wire used in a wire electrical discharge machine (wire EDM) extending through the opening in the die 4 may be used to finish the opening after the curved edge has been formed.

Figure 2:
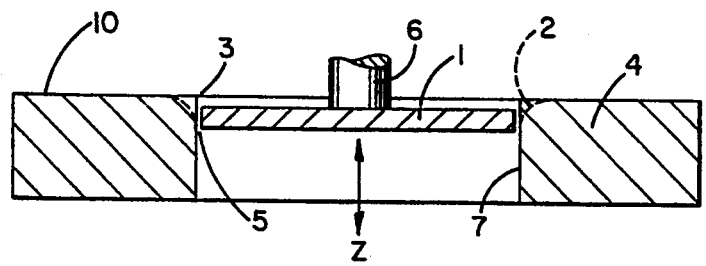
FIGS. 2–5 are similar cross-sectional side views, with FIG. 2 being taken along line 2—2 of FIG. 1, that show the orbital motion of the electrode in conjunction with the translation of the electrode.

In order to machine a curve 2 onto the edge 3 of the die 4, the electrode 1 is mounted on an EDM by support 6, centered in the die by conventional methods, and inserted into the die to the desired depth so that the electrode is in a neutral, centered position, as shown in FIGS. 1 & 2. For example, the electrode 1 is centered in the die 4 and inserted into the die to a depth equal to the innermost point of the curve 2 to be machined on the edge 3. The tank of the EDM is filled with dielectric coolant fluid and the die is grounded. An electric charge is then applied to the electrode, and the electrode is moved in a small circular orbital path in a plane parallel to the plane of the cutting face 10 of the die 4 about the electrodes neutral, centered positioned without any change of orientation of the electrode in the plane parallel to the plane of the cutting face 10.

The electrode to cavity spacing is not critical. The spacing must merely be brought into an electrical discharge distance for machining to start.

In one arrangement the spacing from the electrode to the cavity is at the critical point where discharge starts in which case the machining starts with the electrode in the cavity and no orbiting will take place until the electrode is moved outwardly to initiate the bigger machining area required for formation of the curved edge.

The arrangement could also be that the clearance is greater than the discharge distance with orbital motion then being needed to initiate machining.

Figure 3:
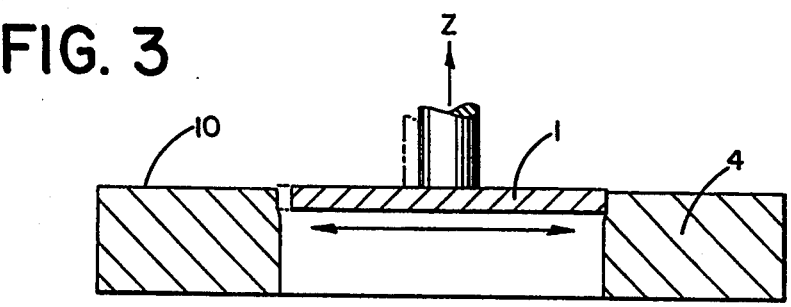
Figure 4:
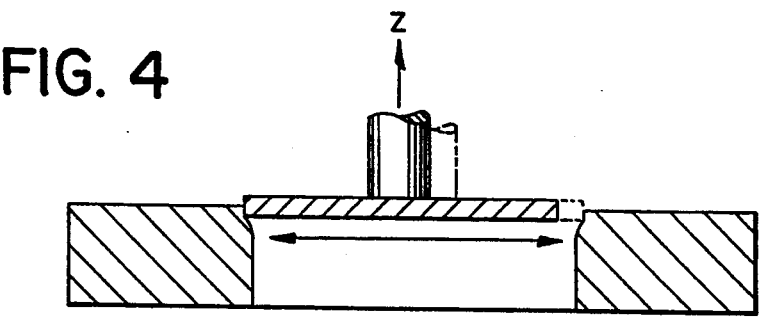

As the electrode is moved in the small orbital path, the inside wall 7 of the die is electrically eroded away by the electrode 1 as shown in FIG. 3. The dashed line 9 in FIG. 1 is a representation of the portion of the die 4 that would be removed by moving the electrode 1 in a small circular path.

The normal machining sequence is to produce a charge in the electrode just insufficient to initiate machining and then to move the electrode outwardly while commencing orbiting. Alternatively one can commence orbiting to initiate machining followed by starting translation and an increase in the orbit.

Figure 6:
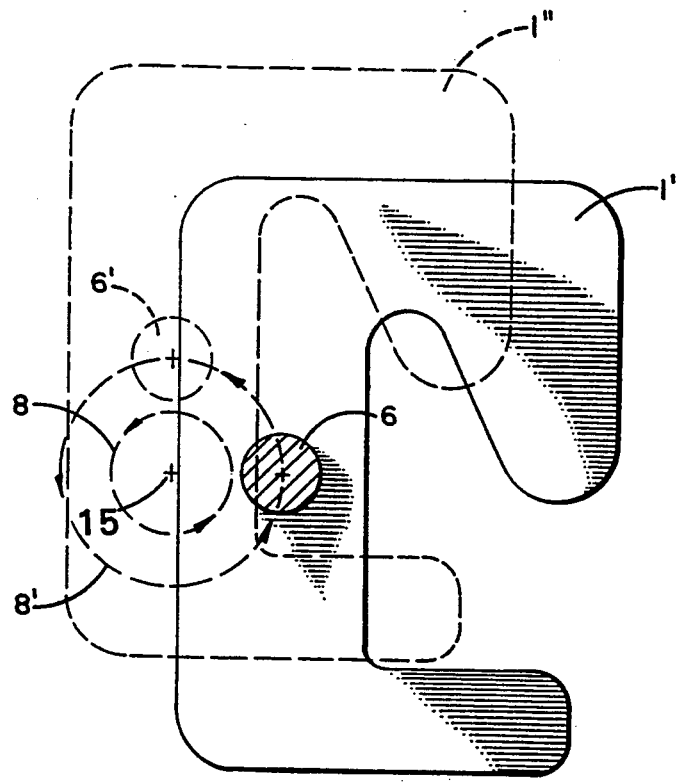
FIG. 6 shows the orbital motion of the electrode according to the method of the present invention.

FIG. 6 shows a greatly exaggerated representation of the orbital motion of the electrode 1.

Figure 5:
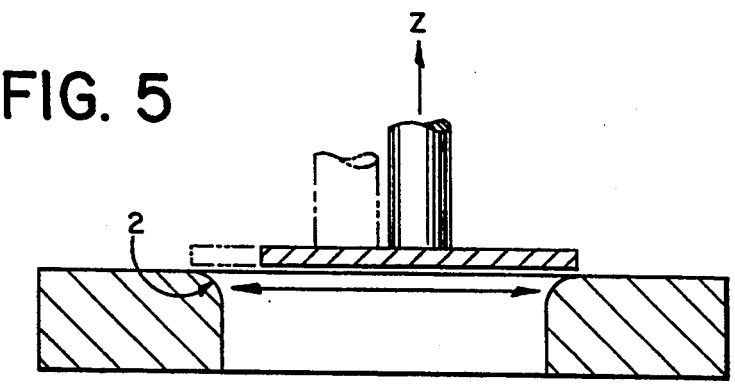

While the electrode 1 is being moved in the small circular orbit 8, the electrode 1 is simultaneously translated in the direction towards the opening of the die with a corresponding increase in the diameter of the orbital motion of the die (from 8 to 8' in FIG. 6; and from FIG. 2 to FIG. 5), thereby forming the curve on the edge of the die (FIG. 5). In this way, the electrode is first inserted into the die and is then withdrawn from the die with an increasing orbital motion (e.g. 8 to 8' in FIG. 6) forming the radius on the edge of the die (also see FIGS. 2–5). In other words, the electrode is orbited from 6 to 6' about its neutral position 15 while retaining its orientation within the die opening, the magnitude of the orbital path being determined to produce the desired EDM machining of the entire transverse shape of the die opening.

It can be appreciated that the electrode could alternatively be centered just above the opening of the die, then moved in an orbital path and translated along its longitudinal axis into the die with a corresponding decrease in the diameter of the orbital path thereby machining the radius onto the edge of the die.

The complex three dimensional motion of the electrode is accomplished by mounting the shaft 6 of the electrode in the spindle of a computer controlled EDM three dimensional motion. An electrical discharge machine, capable of moving an electrode in complex three dimensional patterns, is the Roboform 40, EDM sinker made by Charmilles Technologies of Geneva, Switzerland.

The instant invention provides a method for accurately and inexpensively machining a curve onto the edge of a punch or die. Furthermore, the instant invention machines a curve onto the edge of a punch or die much more quickly and accurately than the manual method of the prior art. The quickness and accuracy of the present invention results in great savings in tool making and tool maintenance time, manpower, and produces a better quality metal stamping.

I claim:

1. A method of forming a curve on a cutting edge defining a desired shape of a desired size on a metallic component in the form of a punch or die, comprising the steps of:

providing an electrode having a shape corresponding to the desired shape and sized to facilitate electrical discharge machining of the curve on the edge;

positioning the electrode in relation to the edge with a clearance therebetween;

generating a potential difference, between the component and the electrode, capable of electrically discharge machining the edge;

moving the electrode in an orbital path in a plane without changing the orientation of the electrode relative to the component to discharge machine the edge;

translating the electrode normal to the plane;

varying the magnitude of the orbital path in relation to the translation to form the curve onto the edge.

2. A method of forming a curve on a cutting edge, of a metallic component in the form of one of a punch and a die, joining a cutting face and a shaped feature having a length, normal to the cutting face, and defining, normal to and throughout its length, a desired shape of a desired size for cooperation with the other of the punch and the die to stamp smooth edged blanks, comprising the steps of:

providing an electrode having a shape corresponding to the desired shape and sized to facilitate electrical discharge machining of the curve on the edge;

aligning and orienting the electrode relative to the shaped feature with a clearance therebetween;

generating a voltage differential between the electrode and the component capable of electrical discharge machining the edge;

moving the electrode in a circular path in a plane normal to the length without changing the orientation of the electrode relative to the edge to discharge machine the edge; and translating the electrode in a direction along the length while varying the diameter of the circular path in timed relation with the translation in order to electrically discharge machine the curve on the edge of the component.

3. A method according to claim 2 wherein the component is a punch and the electrode has a shape that corresponds to the desired shape and is sized larger than the desired shape to form the clearance.

4. A method according to claim 2 wherein the component is a die and the electrode has a shape that corresponds to the desired shape, and is sized slightly smaller than the desired shape to form the clearance.

5. A method according to claim 3 wherein the desired size of the shape is produced after the curve is formed.

6. A method according to claim 4 wherein the desired shape and size is produced after the curve is formed.

7. A method of forming a curve on a cutting edge a metallic component in the form of a punch or die comprising the steps of:

providing an electrode having a shape corresponding to a desired shape of the component and being sized to closely mate with the desired shape;

aligning the centroid of the electrode with the centroid of the shape and orienting the electrode similarly to the orientation of the desired shape;

generating a potential difference between the electrode and the component capable of electrically discharge machining the component;

moving the electrode in a circular path about the centroid of the shape without changing the electrodes orientation relative to the shape;

translating the electrode along a central axis passing through the centroid of the shape while varying the diameter of the circular path in order to electrical discharge machine the curve on the edge.

8. A method according to claim 7, wherein the electrode has a shape that is identical to a desired shape defined by a cutting edge of a punch, and is sized slightly larger than the desired shape.

9. A method according to claim 7, wherein the electrode has a shape that is identical to a desired shape defined by a cutting edge of a die, and is sized slightly smaller than the desired shape.

10. A method according to claim 7, wherein the curved edge is formed while translating the electrode along the central axis from the exterior of the component and comprising the step of:

translating the electrode along the central axis while maintaining the smallest diameter of the circular path used to form the curve to electrically discharge machine the component to the desired shape having a desired size.

* * * * *